United States Patent
Bonwick et al.

(10) Patent No.: US 7,533,225 B1
(45) Date of Patent: May 12, 2009

(54) METHOD AND APPARATUS FOR ENABLING ADAPTIVE ENDIANNESS

(75) Inventors: Jeffrey S. Bonwick, Los Altos, CA (US); William H. Moore, Fremont, CA (US); Matthew A. Ahrens, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 532 days.

(21) Appl. No.: 10/919,886

(22) Filed: Aug. 17, 2004

(51) Int. Cl.
*G06F 13/00* (2006.01)

(52) U.S. Cl. .................................... 711/156

(58) Field of Classification Search ............... None
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki et al. | |
| 5,155,847 A | 10/1992 | Kirouac et al. | |
| 5,371,885 A | 12/1994 | Letwin | |
| 5,403,639 A | 4/1995 | Belsan et al. | |
| 5,410,667 A | 4/1995 | Belsan et al. | |
| 5,539,879 A * | 7/1996 | Pearce et al. | 714/47 |
| 5,675,802 A | 10/1997 | Allen et al. | |
| 5,781,923 A * | 7/1998 | Hunt | 711/128 |
| 5,819,292 A | 10/1998 | Hitz et al. | |
| 6,202,146 B1 * | 3/2001 | Slaughter et al. | 713/1 |
| 6,202,147 B1 * | 3/2001 | Slaughter et al. | 713/1 |
| 6,209,111 B1 | 3/2001 | Kadyk et al. | |
| 6,341,341 B1 | 1/2002 | Grummon et al. | |
| 6,745,284 B1 | 6/2004 | Lee et al. | |
| 6,745,305 B2 | 6/2004 | McDowell | |
| 6,795,966 B1 | 9/2004 | Lim et al. | |
| 6,829,617 B2 | 12/2004 | Sawdon et al. | |
| 6,857,001 B2 | 2/2005 | Hitz et al. | |
| 6,892,211 B2 | 5/2005 | Hitz et al. | |
| 7,007,196 B2 | 2/2006 | Lee et al. | |
| 7,032,154 B2 | 4/2006 | Kidorf et al. | |
| 7,043,677 B1 | 5/2006 | Li | |
| 7,086,064 B1 * | 8/2006 | Stevens | 719/310 |
| 7,133,964 B2 | 11/2006 | Rodrigues et al. | |
| 7,162,486 B2 | 1/2007 | Patel et al. | |
| 7,174,352 B2 | 2/2007 | Kleiman et al. | |
| 7,200,715 B2 | 4/2007 | Kleiman et al. | |
| 2001/0037433 A1 * | 11/2001 | Dempsey et al. | 711/141 |
| 2002/0004883 A1 | 1/2002 | Nguyen et al. | |
| 2002/0055942 A1 | 5/2002 | Reynolds | |
| 2002/0087788 A1 | 7/2002 | Morris | |

(Continued)

OTHER PUBLICATIONS

Sony. MXF. [online]. Sep. 15, 2003 [retrieved on Mar. 26, 2007]. Retrieved from the Internet <URL:http://www.sony-bplabs.com/research/frm_mxf.htm>.*

(Continued)

*Primary Examiner*—Reginald G. Bragdon
*Assistant Examiner*—Larry T Mackall
(74) *Attorney, Agent, or Firm*—Osha • Liang LLP

(57) ABSTRACT

A method for reading a block, involving receiving a request to obtain the block, wherein the request comprises a block pointer, determining a block endianness by reading an endianness bit, obtaining the block using the block pointer, and byte-swapping data in the block to obtain a byte-swapped block, if a host endianness does not match the block endianness.

18 Claims, 8 Drawing Sheets

U.S. PATENT DOCUMENTS

| | | | |
|---|---|---|---|
| 2002/0093691 A1* | 7/2002 | Durrant et al. | 358/404 |
| 2002/0161972 A1 | 10/2002 | Talagala et al. | |
| 2003/0033477 A1 | 2/2003 | Johnson et al. | |
| 2003/0084242 A1 | 5/2003 | Strange et al. | |
| 2003/0126107 A1 | 7/2003 | Yamagami | |
| 2003/0145167 A1 | 7/2003 | Tomita | |
| 2003/0159007 A1* | 8/2003 | Sawdon et al. | 711/154 |
| 2003/0204699 A1* | 10/2003 | Talagala et al. | 711/202 |
| 2004/0098720 A1 | 5/2004 | Hooper | |
| 2004/0107314 A1 | 6/2004 | Kim et al. | |
| 2004/0123063 A1 | 6/2004 | Dalal et al. | |
| 2004/0123202 A1* | 6/2004 | Talagala et al. | 714/736 |
| 2004/0225834 A1 | 11/2004 | Lu et al. | |
| 2004/0234000 A1 | 11/2004 | Page | |
| 2005/0010620 A1 | 1/2005 | Silvers et al. | |
| 2005/0097270 A1 | 5/2005 | Kleiman et al. | |
| 2005/0235154 A1 | 10/2005 | Serret-Avila | |
| 2006/0168409 A1 | 7/2006 | Kahn et al. | |
| 2006/0218644 A1 | 9/2006 | Niles et al. | |
| 2006/0256965 A1 | 11/2006 | Rowe | |

OTHER PUBLICATIONS

Austin, B.; "A Dynamic Disc Allocation Algorithm Designed to Reduce Fragmentation During File Reloading"; Information Sciences Laboratory, Corporate Research and Development Center, General Electric Company, 1970 (4 pages).

Goodheart, B. et al.; "The Magic Garden Explained"; Prentice Hall, 1994 (8 pages).

Stallings, W.; "Computer Organization and Architecture: Designing for Performance"; Prentice Hall, 2000 (4 pages).

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al., "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am 23.05.1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Tranactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

* cited by examiner

METHOD AND APPARATUS FOR ENABLING ADAPTIVE ENDIANNESS

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

To access a file, the operating system (via the file system) typically provides file manipulation interfaces to open, close, read, and write the data within each file. An application, which may reside on the local system (i.e., computer) or may be located on a remote system, uses files as an abstraction to address data. Conventionally, this data is stored on a storage device, such as a disk. The file system stores data on the storage device by managing the allocation of space within the storage device.

Typically, the volume manager provides space, which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocation use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

Typically, file systems store data on disk using one of two schemes: big endian or little endian. In a file system implementing the big endian scheme, data is stored on disk such that the most significant byte (MSB) of the data is stored in memory at the lowest address, and the least significant byte (LSB) is stored at the highest address. In contrast, a file system implementing a little endian scheme, the LSB of the data is stored in memory at the lowest address, and the MSB is stored at the highest address.

Conventionally, in order to use data stored on disk using one type of scheme (i.e., big endian or little endian) on a file system that uses a different type of scheme, one of the systems must byte swap all the data that is to be used by the target system. For example, in a networking environment where multiple machines (i.e., computers, servers, etc.) are connected to the same network, there may be some machines that use a big endian scheme, and some machines that use a little endian scheme to store data. Because the networking environment (i.e., sending network traffic via Internet Protocol) as a whole functions using network byte order (i.e., a big endian scheme), all the machines that use little endian must byte swap network traffic (i.e., packets) before sending and receiving traffic to or from the network.

Existing file systems store data on physical disks using one of the two endian schemes, typically the scheme used by the CPU of the system. File systems typically use the same method described above, i.e., byte swapping, in order to migrate data to and from file systems using different underlying schemes.

SUMMARY

In general, in one aspect, the invention relates to a method for reading a block, comprising receiving a request to obtain the block, wherein the request comprises a block pointer, determining a block endianness by reading an endianness bit, obtaining the block using the block pointer, and byte-swapping data in the block to obtain a byte-swapped block, if a host endianness does not match the block endianness.

In general, in one aspect, the invention relates to a method for writing a block comprising receiving a request to write the block, allocating space in a storage pool to store the block in response to the request, writing the block to the allocated space in the storage pool, generating a block pointer referencing the block, wherein the block pointer comprises an endianness bit, and setting the endianness bit based on a host endianness.

In general, in one aspect, the invention relates to a system, comprising a storage pool comprising a data block and an indirect block, wherein the indirect block comprises a data block checksum, an endianness bit, and a data block location, and a storage pool allocator configured to store the data block and the indirect block in the storage pool.

In general, in one aspect, the invention relates to a storage pool comprising a file system, wherein the file system comprises a plurality of child blocks, wherein each of the plurality of child blocks comprises one selected from the group consisting of a data block, and an indirect block, wherein the indirect block references at least one of the plurality of child blocks, a root block referencing at least one of the plurality of child blocks, wherein the root block comprises a root checksum obtained using at least one of the plurality of child blocks, wherein each indirect block comprises an endianness bit and a child block checksum obtained using at least one of the plurality of child blocks, and a storage pool allocator configured to store the root block and the plurality of child blocks in the storage pool.

In general, in one aspect, the invention relates to a computer system for writing a block comprising a processor, a memory, a storage device, and software instructions stored in the memory for enabling the computer system under control of the processor, to receive a request to write the block, allocate space in a storage pool to store the block in response to the request, write the block to the allocated space in the storage pool, generate a block pointer referencing the block, wherein the block pointer comprises an endianness bit, and set the endianness bit based on a host endianness.

In general, in one aspect, the invention relates to a computer system for reading a block comprising a processor, a memory, a storage device, and software instructions stored in the memory for enabling the computer system under control of the processor, to receive a request to obtain the block, wherein the request comprises a block pointer, determine a block endianness by reading an endianness bit, obtain the block using the block pointer, and byte-swap data in the block to obtain a byte-swapped block, if a host endianness does not match the block endianness.

In general, in one aspect, the invention relates to a computer readable medium for writing a block comprising software instructions to receive a request to write the block, allocate space in a storage pool to store the block in response to the request, write the block to the allocated space in the storage pool, generate a block pointer referencing the block, wherein the block pointer comprises an endianness bit, and set the endianness bit based on a host endianness.

In general, in one aspect, the invention relates to a computer readable medium for reading a block comprising software instructions to receive a request to obtain the block, wherein the request comprises a block pointer, determine a block endianness by reading an endianness bit, obtain the block using the block pointer, and byte-swap data in the block to obtain a byte-swapped block, if a host endianness does not match the block endianness.

In general, in one aspect, the invention relates to a network system having a plurality of nodes comprising a storage pool comprising a data block and an indirect block, wherein the indirect block comprises a data block checksum, an endianness bit, and a data block location, and a storage pool allocator configured to store the data block and the indirect block in the storage pool, wherein the storage pool resides on any one of the plurality of nodes, and wherein the storage pool allocator resides on any one of the plurality of nodes.

Other aspects of the invention will be apparent from the following description and the appended claims.

DETAILED DESCRIPTION

Figure 1:
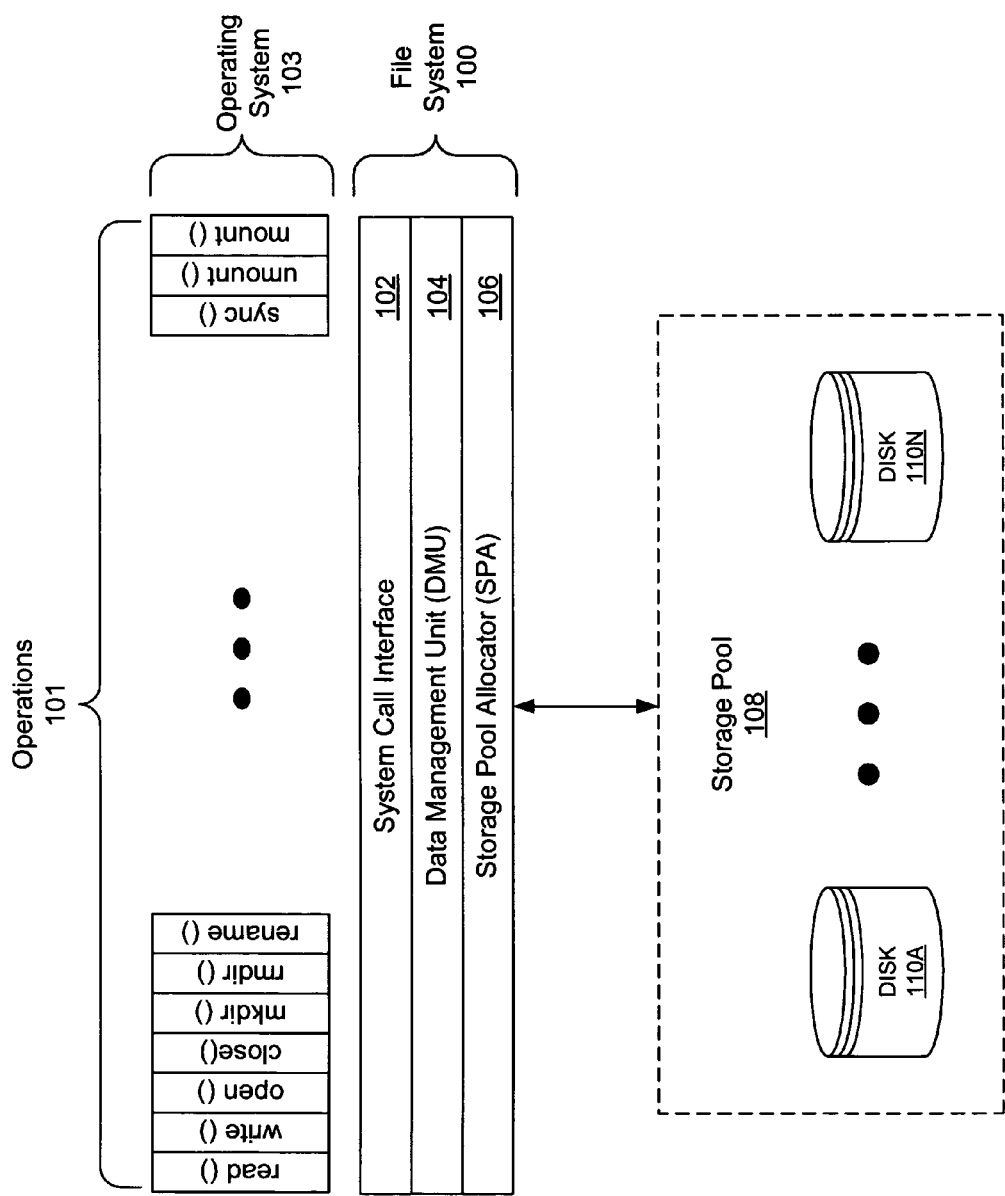
FIG. 1 shows a system architecture in accordance with an embodiment of the invention.

Exemplary embodiments of the invention will be described with reference to the accompanying drawings. Like items in the drawings are shown with the same reference numbers. Further, the use of "ST" in the drawings is equivalent to the use of "Step" in the detailed description below.

In an embodiment of the invention, numerous specific details are set forth in order to provide a more thorough understanding of the invention. In other instances, well-known features have not been described in detail to avoid obscuring the invention.

In general, embodiments of the invention relate to providing a method for storing data using big endian and little endian schemes in a single file system. Additionally, embodiments of the invention provide a method for reading data from a file system that is written using both big endian and little endian schemes. Further, embodiments of the invention provide a method and apparatus to migrate data stored using one endian scheme to another endian scheme with limited overhead.

Further, embodiments of the invention provide a method and apparatus such that a host using the file system does not pay an overhead price when writing data because data is always written in the host's native endian scheme. Similarly, a host using the file system to read/retrieve data pays an overhead or performance penalty only when using a different host to read/retrieve the data.

FIG. 1 shows a system architecture in accordance with one embodiment of the invention. The system architecture includes an operating system (103) interacting with a file system (100), which interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks (as described in FIG. 3 below). Additionally, in one embodiment of the invention, the DMU (104) includes functionality to group related work (i.e., modifications to data blocks and indirect blocks) into I/O requests allowing related blocks to be forwarded to the SPA (106) together. The SPA (106)

receives transactions from the DMU (106) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
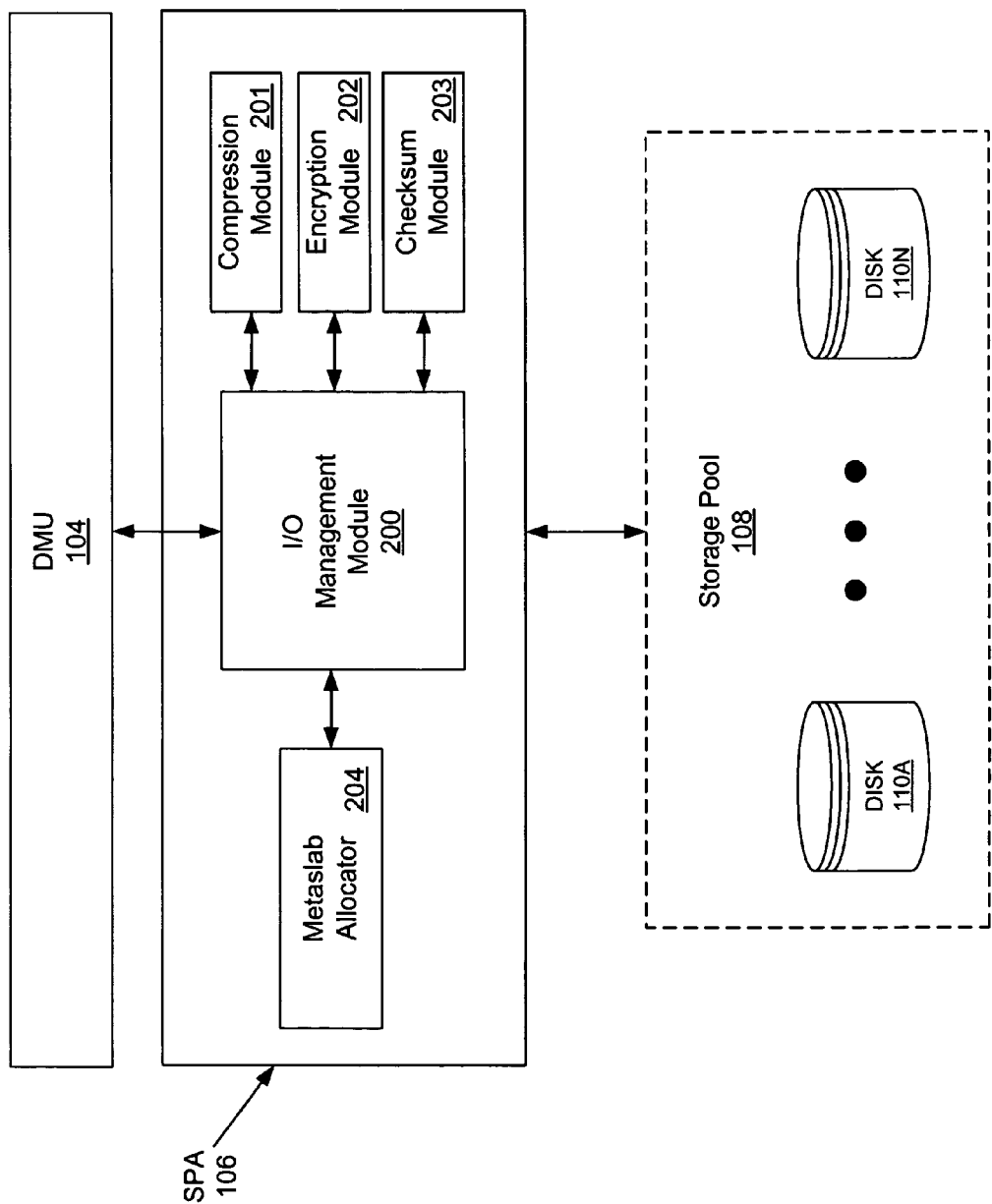
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules is described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks.

The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

As noted above, the storage pool (108) is divided into metaslabs, which are further divided into segments. Each of the segments within the metaslab may then be used to store a data block (i.e., data) or an indirect block (i.e., metadata).

Figure 3:
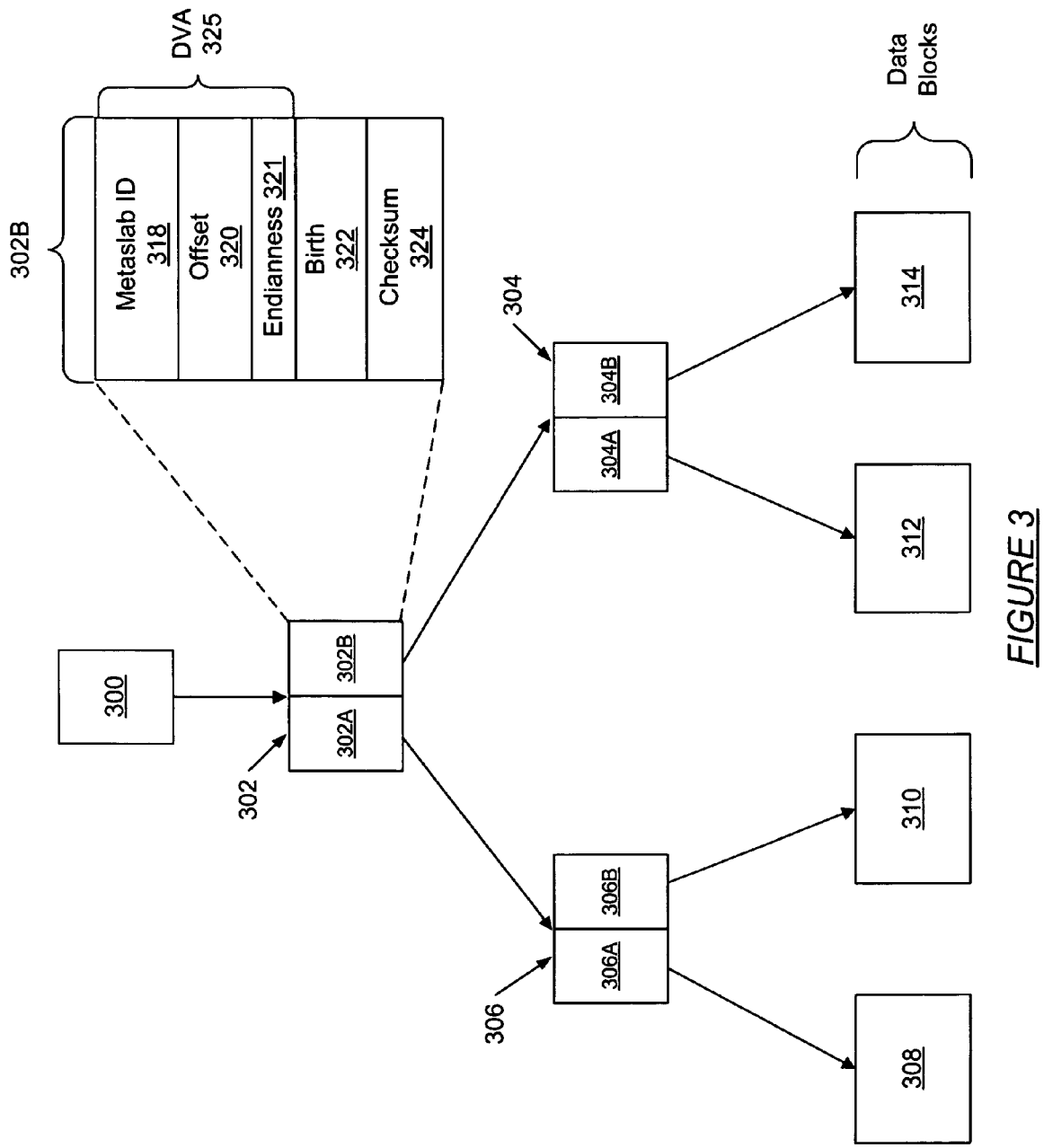
FIG. 3 shows a hierarchical data configuration in accordance with an embodiment of the invention.

FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool.

The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, an endianness bit (321), a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The endianness bit (321) indicates whether the data referenced by the block pointer is stored using a big endian scheme or a little endian scheme. Additionally, in one embodiment of the invention, the metaslab ID (318), offset (320), and the endianness bit (321) are collectively referred to as a disk virtual address (DVA) (325).

The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until modified versions of the data block and indirect block have been committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum, endianness bit) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Using the infrastructure shown in FIGS. 1-3, the following discussion describes a method for writing and reading data in a file system in accordance with an embodiments of the invention. Further, the infrastructure shown in FIGS. 1-3 allows a migrated file system to adapt the native endianness of a host over time.

Figure 4:
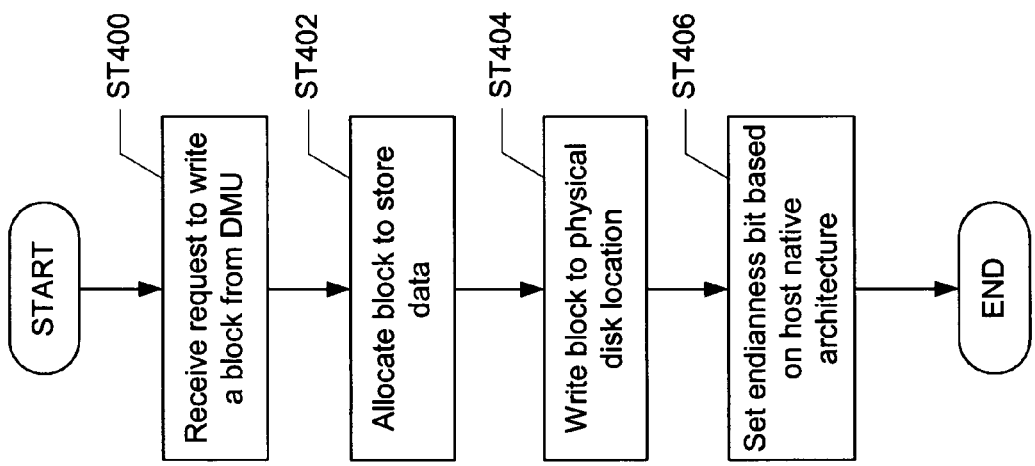
FIG. 4 shows an example in accordance with an embodiment of the invention.

FIG. 4 shows a flow chart for writing a block of data based on a host's native endianness in accordance with one embodiment of the invention. As described above, several different hosts based on little endian scheme or big endian scheme may use the file system to store data and metadata. Initially, a request is received by the SPA from the DMU to write a block of data onto a physical disk location (Step 400). Subsequently, the SPA allocates a block from physical disk space to write the data (Step 402). Once a block is allocated, the data is written to the specified physical disk location (Step 404) based on the host's endianness (i.e., the host that initiates the write request). In one embodiment of the invention, the host may specify its native endianness in response to a query by the file system. Those skilled in the art will appreciate that there may be other ways that the file system obtains the native endianness of the host writing data. As described above, after data is written to the storage pool, the SPA returns the physical location of the data (i.e., the DVA), including the value of the endianness bit based on the scheme used to write the data, to the DMU (Step 406).

In one embodiment of the invention, setting the endianness bit to one indicates that the data written in the referenced block is written using big endian scheme (i.e., with the most significant byte (MSB) written to the lowest memory address location). In contrast, resetting the endianness bit to a value of zero indicates that the referenced block is written using little endian scheme (i.e., with the least significant byte (LSB) written to the highest memory address location). More specifically, the DVA is a field in memory (i.e., a memory location) that includes several bits (i.e., a variable that holds a value of either zero or one), each corresponding to different information. In this case, one of the bits in the DVA is reserved for the endianness bit. In one embodiment of the invention, setting the endianness bit involves changing the value of the bit to a '1' so that the memory location corresponding to the endianness bit contains a value of '1'. Those skilled in the art will appreciate that setting the endianness bit to one may alternatively indicate that the block was written using a little endian scheme, and a value of zero for the endianness bit may indicate that the block was written using a big endian scheme.

Figure 5:
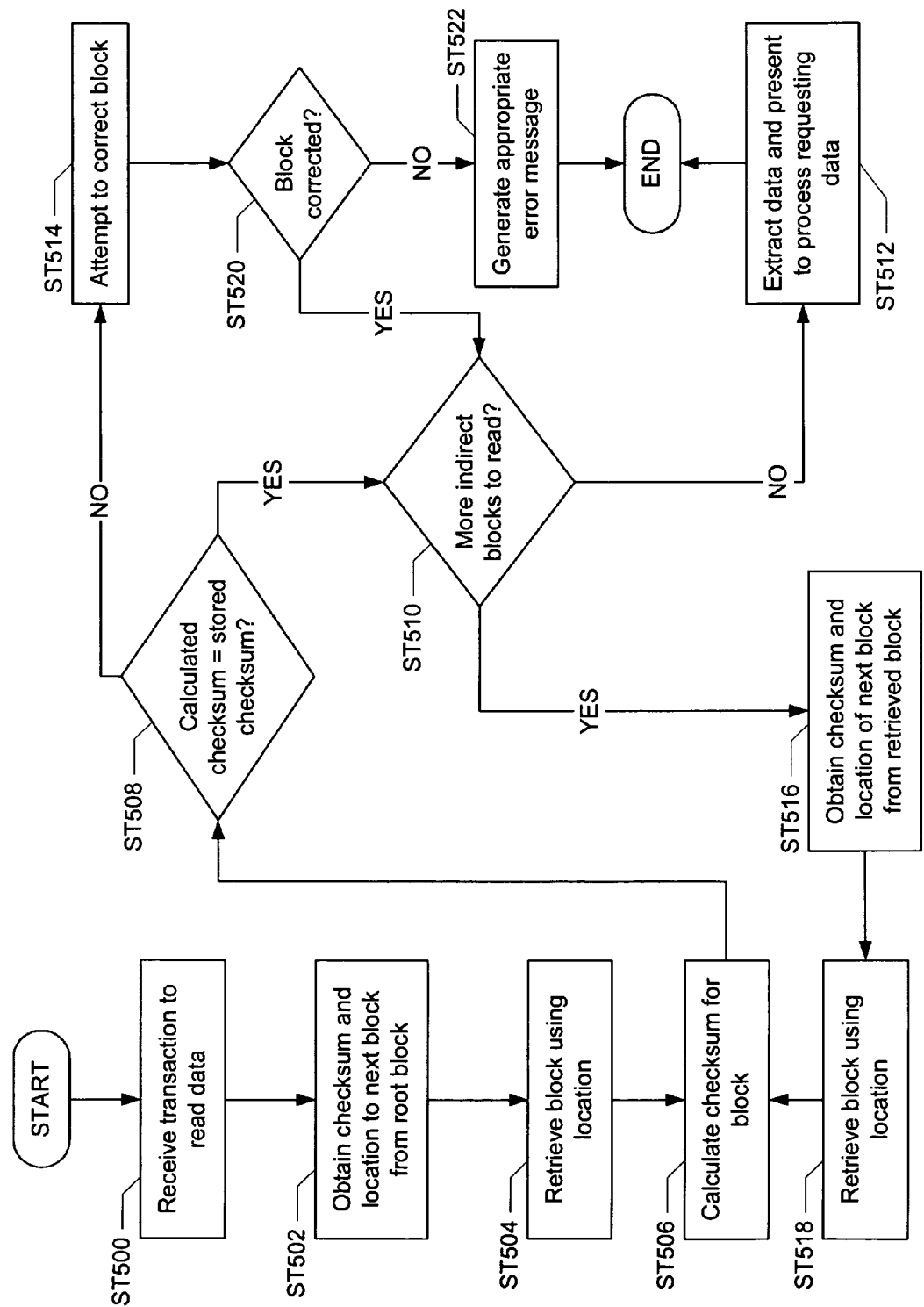
FIG. 5 shows a flow chart for writing data in accordance with an embodiment of the invention.

FIG. 5 shows a flow chart for reading a block in accordance with one embodiment of the invention. Initially, a transaction to read data is received (Step 500). A checksum and a location to the next block (i.e., a data block or an indirect block) stored in the root block are subsequently retrieved (Step 502). Those skilled in the art will appreciate that this may include reading the endianness bit associated with the next block, a process that is explained in FIG. 6 below. The location (e.g., the metaslab ID and offset) is subsequently used to obtain the block (i.e., the data block or the indirect block) (Step 504). The checksum of the retrieved block is then calculated (Step 506). A determination is subsequently made as to whether the stored checksum is equal to the calculated checksum (Step 508).

If the stored checksum is equal to the calculated checksum, then a determination is made as to whether the retrieved block is a data block (Step 510). If the retrieved block is a data block, then the data is extracted from the data block and presented to the process requesting the data (Step 512). Alternatively, if the retrieved block is not the data block, then the location of the next block (stored within a block pointer within the retrieved block) is obtained (Step 516). The block (data block or indirect block) at the location is subsequently obtained (Step 518). Steps 506-514 are subsequently repeated until either data corruption is encountered (i.e., Step 514) or the data block is encountered (i.e., Step 512).

Alternatively, if the stored checksum is not equal to the calculated checksum, then an attempt is made to correct the data or metadata in the block (Step 514). If the attempt to correct the data in the block is successful (Step 520), then a determination is made as to whether more indirect blocks to read exist (i.e., if the correct block is a data block) (Step 510). If the corrected block is the data block to be read, then the contents of the data block is extracted and presented to the application or process requesting the data (Step 512). Otherwise, steps 506-510 are repeated until the data block is encountered. In contrast, if the attempt to correct the data is not successful (Step 520), an error message is generated notifying the application (or process that requested the particular block) that the data is corrupted or otherwise invalid (Step 522).

Figure 6:
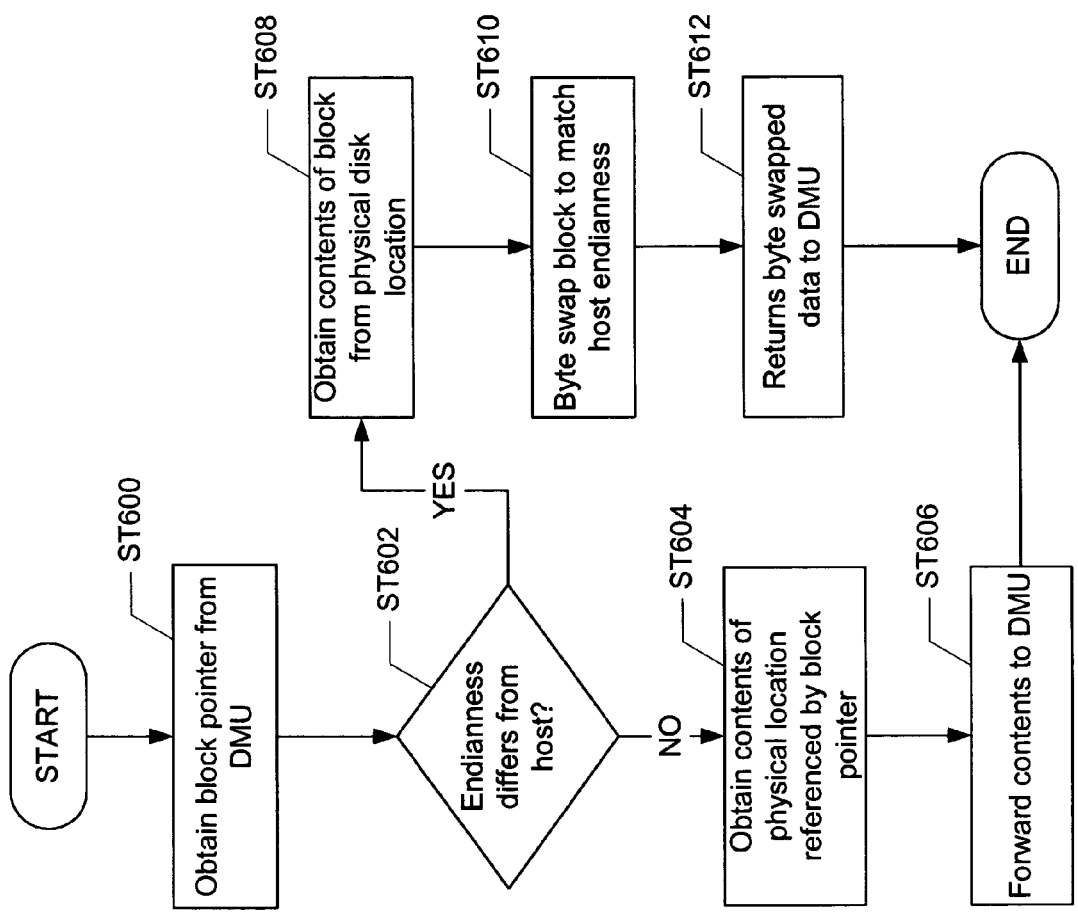
FIG. 6 shows a flow chart for reading data in accordance with an embodiment of the invention.

FIG. 6 shows a flow chart for reading a block for multiple hosts with different endianness schemes in accordance with one embodiment of the invention. More specifically, FIG. 6 begins with Step 502 of FIG. 5. Initially, a block pointer from the DMU is obtained specifying a block to read from the storage pool (Step 600). Subsequently, a determination is made as to whether the endianness of the block referenced by the block pointer obtained differs from the endianness of the host requesting the read operation (Step 602). In one embodiment of the invention, the endianness of the block referenced by the block pointer is obtained by reading the endianness bit located in the DVA of the block pointer obtained from the DMU.

If the endianness of the block referenced by the block pointer does not match the endianness of the host requesting the read operation, then the contents of the block referenced by the block pointer is obtained by the SPA (Step 608). Subsequently, the SPA byte-swaps the contents of the block so that the data corresponds to the endianness of the host (Step 610). For example, if a particular host is based on big endian scheme, and the contents of a block retrieved by the SPA was written in little endian scheme, then the SPA byte swaps the data such that the data is represented as if the data had been written using the big endian scheme (i.e., so that the LSB of the data is located in the lowest memory address, and the MSB is located in the highest memory address). Once the data is byte-swapped, the SPA forwards the data to the DMU (Step 612) and the process ends. Alternatively, if the endianness of the block referenced by the block pointer obtained from the DMU matches the endianness of the host, then no byte-swapping is necessary, and the SPA obtains the contents of the block (Step 604) and forwards the contents to the DMU (Step 606). Those skilled in the art will appreciate the actual process of byte-swapping depends on the underlying structure of the data in the block being byte-swapped.

Figure 7:
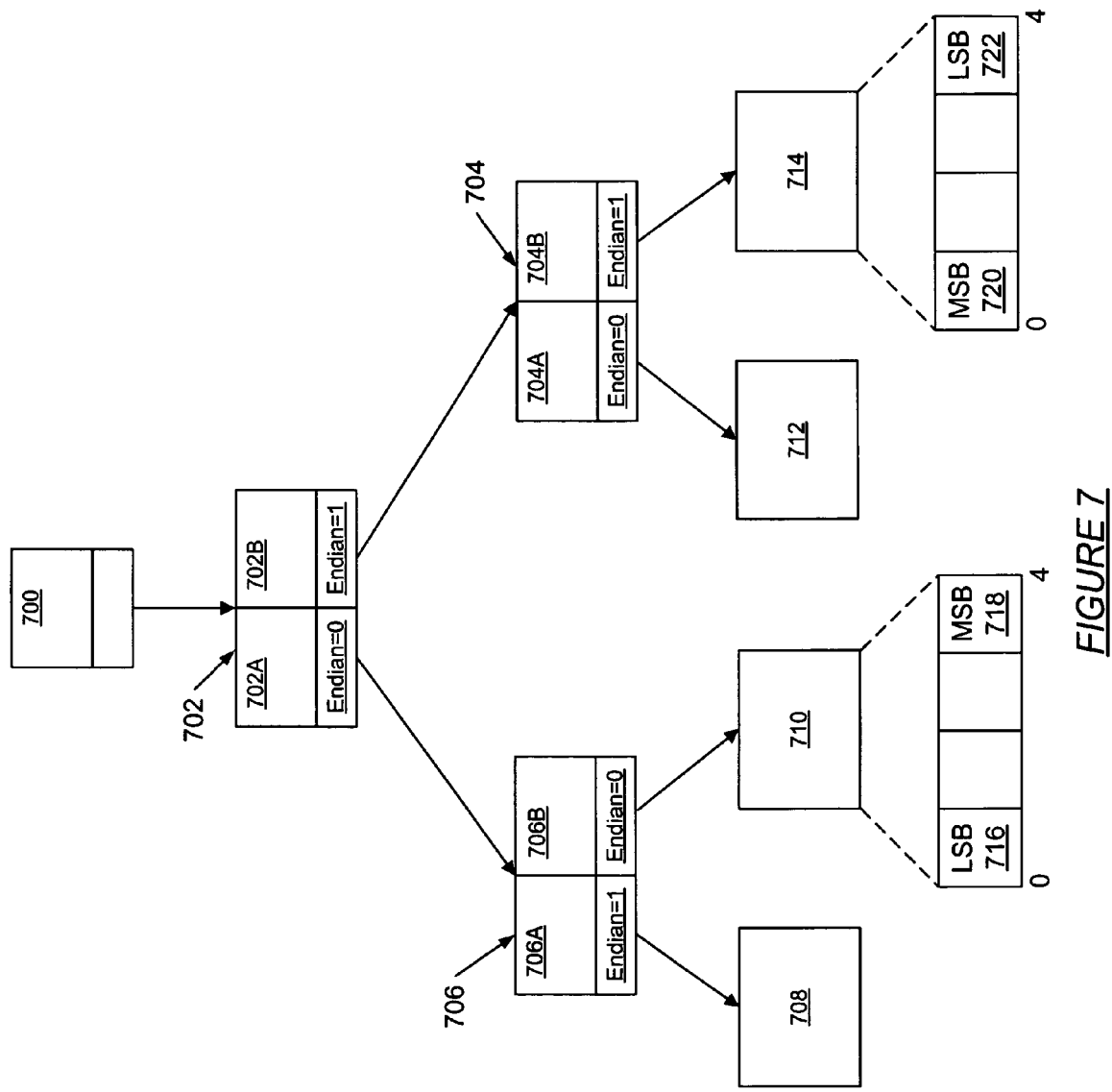
FIG. 7 shows a flow chart for reading data using both big endian and little endian schemes in accordance with an embodiment of the invention.

FIG. 7 shows an example of representing endianness in a file system in accordance with one embodiment of the invention. The hierarchy shown in FIG. 7 is closely related to the hierarchical structure of FIG. 3. Therefore, a root block (700), multiple levels of indirect blocks (702, 704, 706), and data blocks (708, 710, 712, 714) are shown. Additionally, each block pointer (i.e., a block pointer of the root block or indirect block) is shown to include an endianness bit. As described above, the endianness bit is located in the DVA of each block pointer in the storage pool. In one embodiment of the invention, when the endianness bit is set to one, this indicates that the block referenced by the DVA of the block pointer is written using a big endian scheme. Similarly, when the endianness bit is zero, this indicates that the data referenced by the DVA is written using a little endian scheme. In one embodiment of the invention, endianness is represented on a per block basis. Therefore, each block (e.g., data block, indirect block, root block, gang block, etc.) stored within the storage pool may have its own endianness.

For example, FIG. 7 shows the endianness of two data blocks (i.e., data block (710) and data block (714)). As shown in the block pointer (704B) referencing data block (710), data block (710) is written using a little endian scheme. Therefore, the expanded view of data block (710) shows four bytes of data (i.e., memory address 0-4) in which the LSB (716) is written into the lowest memory address (i.e., address 0) and the MSB (718) is written into the highest memory address (i.e., address 4). Similarly, the block pointer (706B) referencing data block (714) indicates that data block (714) is written using a big endian scheme. The expanded view of data block (714) shows four bytes of data in which the MSB (720) is written into the lowest memory address, and the LSB (722) is written into the highest memory address. Those skilled in the art will appreciate that data that is a different size in bytes may be byte-swapped according to the underlying structure of the data.

Further, in one embodiment of the invention, when a file system is migrated from a host based on a big endian scheme to a host based on a little endian scheme (or vice-versa) (e.g., from a SPARC system to an x86 system), the architecture of the file system (e.g., shown in FIGS. 1-3) allows the file system to migrate to the new host's endian scheme with limited overhead. For example, consider the scenario where a file system is migrated from a big endian scheme to a little endian scheme. In this case, initially, when the file system is migrated, most of the data and metadata will be based on a big endian scheme. However, using the method of FIG. 4, as the new host writes data (i.e., using the aforementioned copy-on-write method), the new host rewrites data in its own native scheme. That is, because data blocks are read and rewritten on the host's native endian scheme, all the data stored on disk will be rewritten using the host's native endian scheme. Therefore, over time, the file system migrates to the new host's native endianness. Further, as mentioned above, when the host reads data stored on disk, the SPA byte-swaps data stored using the host's non-native endian scheme on a per block basis. Thus, all the data is not byte-swapped at once and the host may byte-swap only on a demand-driven basis, causing less overhead and performance degradation.

Figure 8:
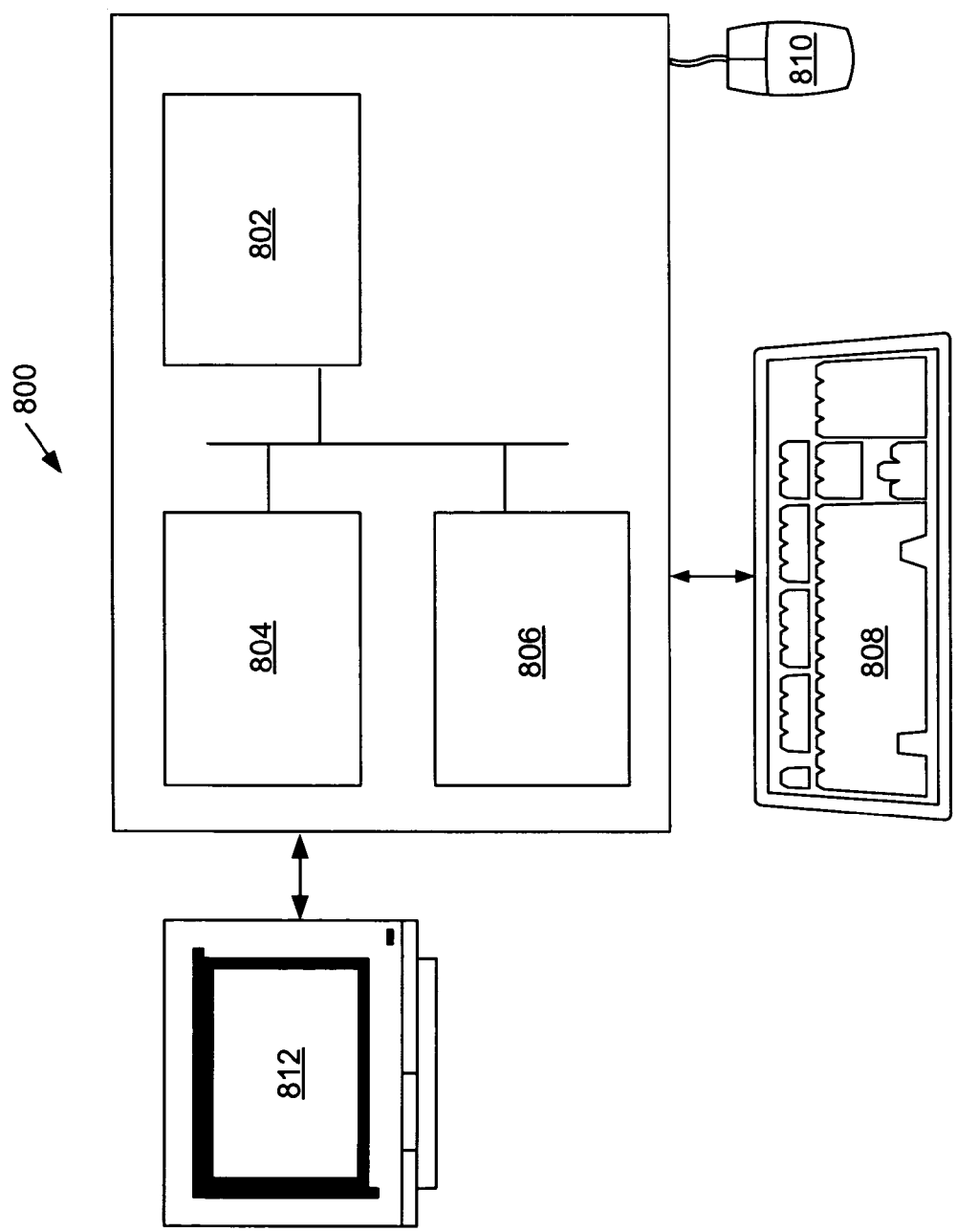
FIG. 8 shows a computer system in accordance with an embodiment of the invention.

One or more embodiments of the invention may be implemented on virtually any type of computer regardless of the platform being used. For example, as shown in FIG. 8, a networked computer system (800) includes a processor (802), associated memory (804), a storage device (806), and numerous other elements and functionalities typical of today's computers (not shown). The networked computer (800) may also include input means, such as a keyboard (808) and a mouse (810), and output means, such as a monitor (812). The networked computer system (800) is connected to a local area network (LAN) or a wide area network via a network interface connection (not shown). Those skilled in the art will appreciate that these input and output means may take other forms. Further, those skilled in the art will appreciate that one or more elements of the aforementioned computer (800) may be located at a remote location and connected to the other elements over a network.

Further, embodiments of the invention may be implemented on a distributed system having a plurality of nodes, where each portion of the invention (e.g., the storage pool, the storage pool allocator, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

Embodiments of the invention provide a method to store data on physical disks based on a host's native endianness. Further, embodiments of the invention allow a file system to be migrated from a host of one type of endianness to another type, while allowing the data stored on disk to migrated to the new endianness on a demand driven basis.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for writing a block comprising:
receiving a request to write a first data block and a second data block;
allocating a first space in a storage pool to store the first data block and a second space in the storage pool to store the second data block in response to the request, wherein the storage pool comprises at least one physical disk;
writing the first data block to the first space;
generating a first block pointer referencing the first data block, wherein the first block pointer comprises a first endianness bit associated with the first data block, and wherein the first block pointer is stored in a first indirect block;
setting the endianness bit for the first data block based on a first host endianness;
writing the second data block to the second space;
generating a second block pointer referencing the second data block, wherein the second block pointer comprises a second endianness bit associated with the second data block, and wherein the second block pointer is stored in the first indirect block; and
setting the endianness bit for the second data block based on a second host endianness, wherein the endianness indicated by the first endianness bit is different from the endianness indicated by the second endianness bit,
wherein the first data block, the second data block, and the first indirect block are each located in physically separate locations in the storage pool.

2. The method of claim 1, wherein the first endianness bit is located in a disk virtual address within the first block pointer, and wherein the second endianness bit is located in a disk virtual address within the second block pointer.

3. The method of claim 1, wherein the first host endianness is an endian scheme used by a first host writing the first data block, and wherein the second host endianness is an endian scheme used by a second host writing the second data block.

4. The method of claim 3, wherein the first host endianness is obtained by querying the first host, and wherein the second host endianness is obtained by querying the second host.

5. The method of claim 1, further comprising:
generating a third block pointer comprising a first indirect block checksum, a first indirect block location and a third endianness bit associated with the first indirect block, wherein the third block pointer is stored in a second indirect block that references the first indirect block.

6. A system, comprising:
a storage pool comprising at least one physical disk configured to store a first data block, a second data block, and a first indirect block,
wherein the first indirect block comprises a first block pointer referencing the first data block, wherein the first block pointer comprises a first data block checksum, a first endianness bit, and a first data block location, and a second block pointer referencing the second data block, wherein the second block pointer comprises a second data block checksum, a second endianness bit, and a second data block location,
wherein the endianness indicated by the first endianness bit associated with the first data block is different from the endianness indicated by the second endianness bit associated with the second data block; and
a storage pool allocator configured to store the first data block, the second data block, and the first indirect block, in the storage pool,
wherein the first data block, the second data block, and the first indirect block are each located in physically separate locations in the storage pool.

7. The system of claim 6, wherein the first endianness bit indicates the endianness of a first host that wrote the first data block and wherein the second endianness bit indicates the endianness of a second host that wrote the second data block.

8. The system of claim 6, wherein the first endianness bit is located in a disk virtual address within the first block pointer and wherein the second endianness bit is located in a disk virtual address within the second block pointer.

9. The system of claim 6, wherein the at least one physical disk in the storage pool is further configured to store a second indirect block, wherein the second indirect block comprises a third block pointer that references the first indirect block, and wherein the third block pointer comprises a first indirect block location, a first indirect block checksum, and a first indirect block endianness bit that indicates the endian scheme used to store the first indirect block.

10. A storage pool comprising a file system, wherein the file system comprises:
a plurality of child blocks, wherein the plurality of child blocks comprise
a plurality of data blocks, and
a plurality of indirect blocks, wherein each indirect block references
at least one of the plurality of child blocks;
a root block referencing at least one of the plurality of child blocks,
wherein the root block comprises a root checksum obtained using at least one of the plurality of child blocks,
wherein at least one of the indirect blocks comprises a first block pointer referencing a first child block and a second block pointer referencing a second child block, wherein the first block pointer comprises a first endianness bit associated with the first child block and a first child block checksum and the second block pointer comprises a second endianness bit associated with the second child block and a second child block checksum;
wherein the endianness indicated by the first endianness bit associated with the first child block is different from the endianness indicated by the second endianness bit associated with the second child block; and
a storage pool allocator configured to store the root block and the plurality of child blocks on at least one physical disk in the storage pool, wherein the first child block, the second child block, and the at least one of the indirect blocks are each located in physically separate locations in the storage pool.

11. The storage pool of claim 10, wherein the first endianness bit indicates the endianness of a first host that wrote the first child block and the second endianness bit indicates the endianness of a second host that wrote the second child block.

12. The storage pool of claim 10, wherein the first endianness bit is located in a disk virtual address within a corresponding indirect block and the second endianness bit is located in a disk virtual address within the corresponding indirect block.

13. A computer system for writing a block comprising:
a processor;
a memory;
a storage device; and
software instructions stored in the memory for enabling the computer system under control of the processor, to:
receive a request to write a first data block and a second data block;
allocate a first space in a storage pool to store the first data block and a second space in the storage pool to store the second data block in response to the request, wherein the storage pool comprises at least one physical disk;
write the first data block to the first space;
generate a first block pointer referencing the first data block, wherein the first block pointer comprises a first endianness bit associated with the first data block, and wherein the first block pointer is stored in an indirect block;
set the endianness bit for the first data block based on a first host endianness;
write the second data block to the second space;
generate a second block pointer referencing the second data block, wherein the second block pointer comprises a second endianness bit associated with the second data block, and wherein the second block pointer is stored in the indirect block; and
set the endianness bit for the second data block based on a second host endianness, wherein the endianness indicated by the first endianness bit is different from the endianness indicated by the second endianness bit,
wherein the first data block, the second data block, and the indirect block are each located in physically separate locations in the storage pool.

14. The computer system of claim 13, wherein the first endianness bit is located in a disk virtual address within the first block pointer and the second endianness bit is located in a disk virtual address within the second block pointer.

15. The computer system of claim 13, wherein the first host endianness is the endian scheme used by a first host writing the first data block and the second host endianness is the endian scheme used by a second host writing the second data block.

16. The computer system of claim 13, wherein the computer system is further configured to:

generate a third block pointer comprising a first indirect block checksum, a first indirect block location and a third endianness bit that indicates the endian scheme used to store the first indirect block, wherein the third block pointer is stored in a second indirect block that references the first indirect block.

17. A computer readable storage medium for writing a block comprising software instructions to:
receive a request to write a first data block and a second data block;
allocate a first space in a storage pool to store the first data block and a second space to store the second data block in the storage pool in response to the request, wherein the storage pool comprises at least one physical disk;
write the first data block to the first space;
generate a first block pointer referencing the first data block, wherein the first block pointer comprises a first endianness bit associated with the first data block, and wherein the first block pointer is stored in an indirect block comprising a plurality of block pointers;
set the endianness bit for the first data block based on a first host endianness;
write the second data block to the second space;
generate a second block pointer referencing the second data block, wherein the second block pointer comprises a second endianness bit associated with the second data block, and wherein the second block pointer is stored in the indirect block; and
set the endianness bit for the second data block based on a second host endianness, wherein the endianness indicated by the first endianness bit is different from the endianness indicated by the second endianness bit,
wherein the first data block, the second data block, and the indirect block are each located in physically separate locations in the storage pool.

18. A network system having a plurality of nodes comprising:
a storage pool comprising a first data block, a second data block, and an indirect block,
wherein the indirect block comprises a first block pointer referencing the first data block and a second block pointer referencing the second data block, wherein the first block pointer comprises a first data block checksum, a first endianness bit, and a first data block location and the second block pointer comprises a second data block checksum, a second endianness bit and a second data block location,
wherein the endianness indicated by the first endianness bit is different from the endianness indicated by the second endianness bit; and
a storage pool allocator configured to store the data block and the indirect block in at least one physical disk in the storage pool,
wherein the storage pool resides on any one of the plurality of nodes,
wherein the storage pool allocator resides on any one of the plurality of nodes,
wherein the first data block, the second data block, and the indirect block are each located in physically separate locations in the storage pool.

* * * * *